June 10, 1958

R. M. SCHIRMER 2,837,893

AUTOMATIC PRIMARY AND SECONDARY AIR FLOW
REGULATION FOR GAS TURBINE
COMBUSTION CHAMBER

Filed Dec. 12, 1952

INVENTOR.
R. M. SCHIRMER

BY
Hudson and Young
ATTORNEYS

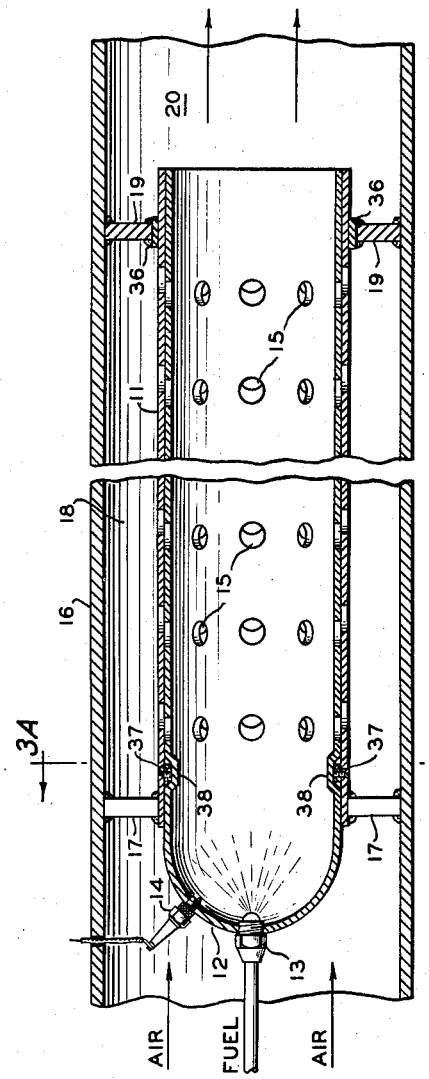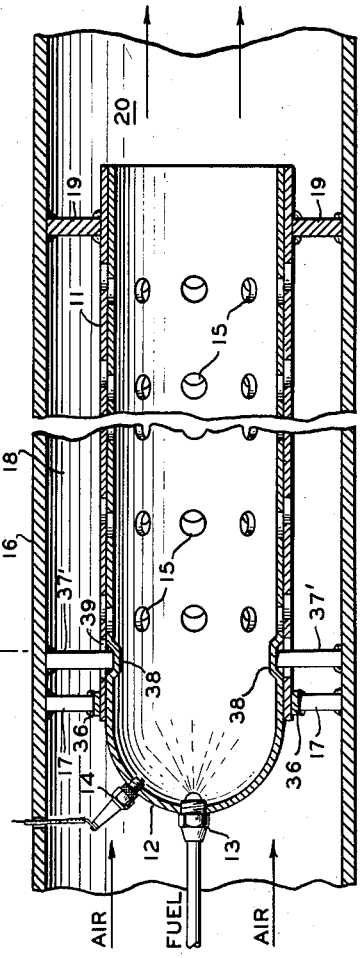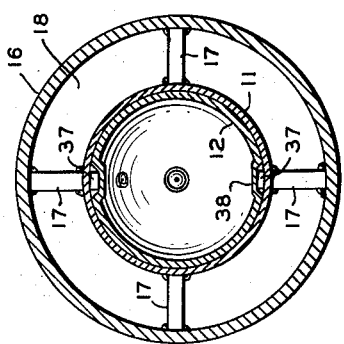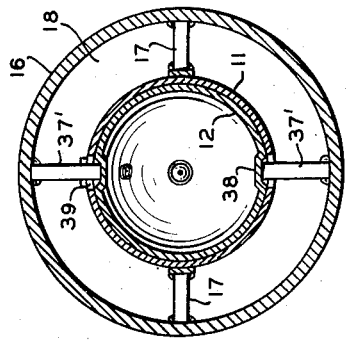

United States Patent Office 2,837,893
Patented June 10, 1958

2,837,893

AUTOMATIC PRIMARY AND SECONDARY AIR FLOW REGULATION FOR GAS TURBINE COMBUSTION CHAMBER

Robert M. Schirmer, Bartlesville, Okla., assignor to Phillips Petroleum Company, a corporation of Delaware Application December 12, 1952, Serial No. 325,508

1 Claim. (Cl. 60—39.23)

This invention relates to an improved combustion chamber for a jet engine. In one aspect it relates to means for automatically controlling the fuel-air ratio of the combustion mixture. In another aspect it relates to means for changing the amount of air admitted to the combustion zone in accordance with engine operating conditions. In a still further aspect this invention relates to a means for controlling during operation the fuel-air ratio in specific combustion zones of the combustion chamber in accordance with the intensity of combustion of the fuel.

Jet engine power plants require large quantities of air to be mixed with small quantities of fuel, so that a problem exists due to the fact that it is necessary to vary the power out-put of the engine without materially affecting combustion conditions. Improper fuel-air ratios result in combustion instability and finally extinction of the flame or blow-out. Blow-out may also occur because either the velocity of the supplied air exceeds the velocity of flame propagation or there is insufficient heat release to maintain the spontaneous ignition temperature.

It is also desirable that the fuel ignited in the combustor be burned completely to reduce the heat loss due to incomplete combustion and to reduce the possibility of long flames which may damage parts of the engine, including the turbine in a turbo-jet engine.

Because of limitations of materials of construction, temperatures in excess of 2000° F. cannot be utilized in the operation of present jet engines and the possibility of the formation of excessively high temperature is reduced by maintaining over-all fuel-air ratios between the values of about 1/30 to 1/120. This over-all fuel-air ratio is generally below or barely within the limits of flammability, and combustion under these conditions is either impossible or very unstable. Consequently, the combustion chamber is divided into two or more combustion zones and in one of these zones an approximately stoichiometric fuel-air mixture is formed under full-load conditions to obtain high temperatures and efficient combustion. In the other combustion zones, the combustion gases are diluted with air to insure complete combustion and reduce the temperature of the combustion products.

Division of the combustion chamber into combustion zones is secured by constructing the walls of the flame tube with perforations or holes so that only a portion of the air applied to the engine is admitted to the region where fuel is injected (primary zone) and the remainder of the air is admitted to a region where combustion is quenched (secondary zone). The number and dimensions of these apertures is fixed and the proportion of air supplied to the separate combustion zones is also substantially constant. Thus, it is difficult to operate the engine within the entire range of altitude, flight speed, and engine speed desirable with an aircraft and still maintain the fuel-air mixture in the primary combustion zone within the range where sufficient air is available for full-load conditions and excessive air is not present under partial load conditions.

I have now developed an improved combustion chamber to provide a means for automatically controlling the relative concentrations of fuel and air in the combustion zones of jet engine power plants. This new combustion chamber provides for positive control of the flow of air into the several combustion zones of the combustion chamber in accordance with the degree of combustion therein by utilizing thermal expansion or contraction of one or more elements of the combustion chamber. Changes of the fuel-air ratio in the combustion mixture result in variations of the intensity of combustion, and the variations of temperature thereby produced effect the thermal expansion or contraction of at least one element of the combustion chamber.

This improved combustion chamber is particularly adapted to turbojet engines, provides optimum combustion conditions for starting, permits maximum thrust to be developed, and results in improved fuel economy.

According to the invention, there is provided an improved jet engine combustion chamber comprised of concentrically and slidably engaged perforated tubes, said tubes being slidable upon each other responsive to expansion and contraction with temperature changes, at least one of said tubes being fixed in respect of motion of the other, the relative positions of the perforations in each of said tubes being such as to register and to control fluid flow therethrough automatically responsive to said temperature changes by virtue of expansion and contraction of at leat one element of said combustion chamber.

Also according to the invention, there is provided an improved method for the operation of a combustion chamber in an engine of the type herein considered which comprises automatically controlling the flow of air into the said combustion chamber of such an engine in accordance with the heat developed within said combustion chamber.

The accompanying drawings illustrate by way of example several forms of apparatus for carrying out the method of the invention. In these drawings:

Figure 1 is a diagrammatic sectional elevation of a combustion chamber comprised of telescopically mounted and slidably engaged perforated tubes comprising a flame tube expandible and contractible with changes in temperature, whereby the fuel-air ratio within the combustion chamber can be controlled by varying the alignment and thereby the effective size of the perforations admitting air into said combustion chamber.

Figure 3 is a diagrammatic sectional elevation of a jet engine combustion chamber comprised of concentrically mounted and slidably engaged perforated tubes wherein the outer of said perforated tubes is fixed in respect of the housing of the combustion chamber and the inner of said perforated tubes is fixed in respect of said outer perforated tube.

Figure 1:
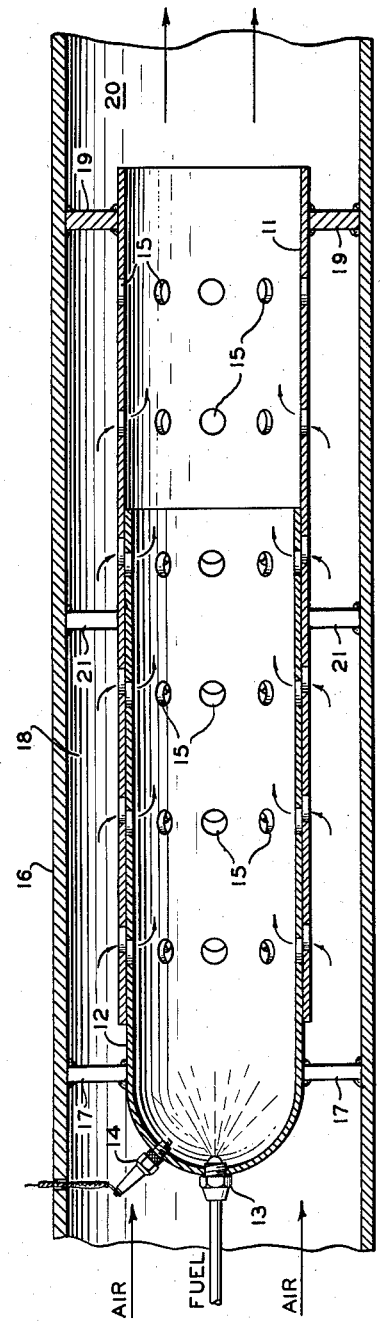

Figure 3–A is a cross section along the line A—A of Figure 3.

Figure 4 is a diagrammatic sectional elevation of an embodiment, similar to that shown in Figure 3, wherein both the inner and the outer perforated tubes are fixed in respect of the housing of the combustion chamber.

Figure 4–A is a cross section along the lines A—A of Figure 4.

In the further description given below all embodiments of the invention are described assuming an increase in temperature occurring within the combustion chamber. It is assumed that the perforations in the walls of the flame tube are substantially in a starting position when the engine is not operating and are substantially open when the engine is being operated under full-load conditions. Like reference numerals have been used throughout the drawings to designate like portions of the apparatus.

In the embodiment shown in diagrammatic form in Figure 1, my improved combustion chamber comprises a flame tube constructed of two cylindrical tubes 11 and 12 of slightly different diameter slidably engaged longitudinally when mounted concentrically. Cylindrical tube 12 is closed at one end to form the enclosed space of the primary combustion zone. Fuel injector nozzle 13 and spark plug 14, or other ignition device, are mounted in this enclosed end. The other cylindrical tube, 11, is open at both ends and extends almost the entire length of the combustion chamber. Cylindrical tube 12 is somewhat shorter in length than cylindrical tube 11 and the two tubes are slidably engaged only in the space defined by the primary combustion zone when the engine is operating under full load conditions. Each of the cylindrical tubes is perforated with holes 15 for the passage of air from the air duct 18 into the different combustion zones of the combustion chamber. The telescopic slidably engaged cylindrical tubes 11 and 12 are rigidly mounted in housing 16 by spokes 17 and disc 19, as by the welds shown, so that the longitudinal axes of cylindrical tubes 11 and 12 coincide with the longitudinal axis of housing 16 forming annular space 18 for the passage of air between the walls of housing 16 and the cylindrical tubes 11 and 12. The spokes 17 are designed to present a minimum of cross-sectional area in annular space 18 to minimize the restriction to the flow of air while providing sufficient stiffness to prevent movement of cylindrical tube 12 with respect to housing 16. The downstream end of cylindrical tube 11 is rigidly attached to housing 16 by solid disc 19 which also forms the end wall of annular space 18 to prevent the loss of air into exhaust section 20. A spacer 21, similar to spokes 17 in design but rigidly attached to housing 16 as by the welds shown, and slidably engaged with cylindrical tube 11, maintains the center portion of the combustion chamber centrally located in housing 16.

The mounting of cylindrical tubes 11 and 12 is critical and determines the alignment of the perforations 15 in each. The cylindrical tubes 11 and 12 should be so mounted that the perforations 15 are out of alignment to some degree during starting or low-load conditions and substantially in alignment at full-load conditions. Thus, in operation, at low rates of fuel flow perforations 15 are partially closed to admit a limited but sufficient amount of air into the primary combustion zone to establish an approximately stoichiometric fuel-air mixture, and under full-load conditions the perforations are completely open to substantially maintain the stoichiometric mixture to prevent combustion instability and rich mixture blowout. The regulation of the alignment of perforations 15 is completely automatic and depends upon the thermal expansion or contraction of the rigidly mounted cylindrical tubes 11 and 12 as determined by the state of the combustion process.

The above embodiment provides for the regulation of the fuel-air ratio in the primary combustion zone; however, the air flow in other specific localities in the combustion chamber can also be regulated. The cylindrical tube 12 of the combustion chamber can be made the same length as cylindrical tube 11 so that the alignment of the perforations throughout the complete length of the flame tube can be controlled. In such perforations the alignment or degree of register of the perforations admitting air to the primary combustion zone will usually not be the same as the alignment or degree of register of the perforations admitting air to the secondary combustion zone. Whether the alignment or degree of register of the perforations in the portion of the flame tube comprising the primary combustion zone is greater or less than that in the portion of said flame tube comprising the secondary combustion zone will depend on the relative size and number of the perforations in each of said zones. Thus by suitably locating and designing the holes in each of the cylindrical tubes, the flow of air to both the primary and the secondary combustion zones can also be regulated.

The holes in cylindrical tubes 11 and 12 may be circular in shape and all of the same diameter. However, holes of any shape or size can be employed in any arrangement and many variations and arrangements will occur to those skilled in the art. The embodiment in Figure 1 shows the cylindrical tubes to be circular in cross section and the inner cylindrical tube 12 with the enclosed end, but tubes other than those which are circular in cross section can be used and the closed end tube can be made either the inner or the outer tube. The materials of construction of the cylindrical tubes are usually metal but non-metallic materials can be used provided they possess a sufficiently high coefficient of thermal expansion in addition to the other properties of conventional combustion chambers. Preferably the cylindrical tubes 11 and 12 are each constructed of materials having different coefficients of expansion.

Figure 2:
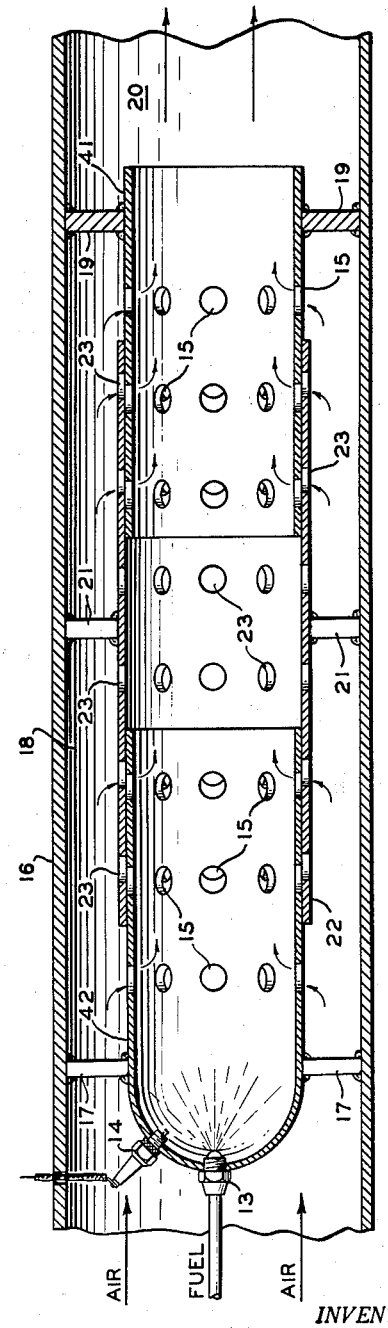
Figure 2 is a diagrammatic sectional elevation of a combustion chamber comprised of two perforated tubes comprising a flame tube expandible and contractible with changes in temperature mounted concentrically and slidably engaged with a third perforated tube.

Figure 2 shows diagrammatically another embodiment for carrying out the method of the invention. In this embodiment there is attached to spokes 21 a perforated cylindrical tube 22 mounted concentrically with perforated tubes 41 and 42 which are slidable longitudinally therewith. Tube 22 is preferably fabricated from suitable material having a lower coefficient of thermal expansion than the material employed in fabricating tubes 41 and 42. The mounting of tubes 41 and 42 within tube 22 is critical in that tubes 41 and 42 should be so mounted that the perforations 15 therein are out of alignment to some degree with the perforations 23 in tube 22 during starting or low-load conditions and substantially in alignment at full load conditions. Similarly as explained in connection with the embodiment given in Figure 1, the air flow to the various combustion zones can be regulated by suitably locating and designing the perforations in each of the cylindrical tubes 41 and 42 with respect to the perforations 23 in tube 22. The operation of this embodiment is similar to that illustrated in Figure 1 and will be readily apparent to those skilled in the art from the above disclosed operation of Figure 1.

Other apparatus for carrying out the method of the invention is shown in Figures 3 and 3–A which show another method for suspending the concentric tubes 11 and 12. Inner perforated tube 12 and outer perforated tube 11 are mounted concentrically and slidably with respect to each other. Outer tube 11 is rigidly fixed with respect to housing 16 by means of spokes 17, as by the welds shown, and slidably fixed with respect to said housing by means of bearing plates 36 attached to closure disk 19 as by means of the welds shown. Inner tube 12 is fixed, at a point near the upstream end thereof, with respect to outer tube 11, by means of key 37 fixed to outer tube 11 as by means of the screw shown and fitted into groove 38 formed by recessing the wall of inner tube 12. As explained in connection with Figure 1 cylindrical tubes 11 and 12 should be so mounted, with respect to each other, that the perforations 15 are out of alignment to some degree during starting or low-load conditions. Thus, as explained in connection with the embodiment given in Figure 1, by proper mounting of tubes 11 and 12, with respect to the alignment, number and size of the perforations in each, the size of the openings admitting air into the various combustion zones can be varied in accordance with changes in temperature therein, thereby controlling the amount of air admitted into the said various combustion zones. Since cylindrical tubes 11 and 12 are each fixed at the same end, and expand or contract in the same direction, it is obvious that each is preferably constructed of a material having a distinctly different coefficient of thermal expansion or contraction than the material used in the other of said tubes.

In the apparatus shown in Figures 4 and 4-A which can also be used to carry out the method of the invention, still another method for suspending tubes 11 and 12 is shown. Inner perforated tube 12 and outer perforated tube 11 are mounted concentrically and slidably with respect to each other. Outer tube 11 is rigidly fixed with respect to housing 16 by means of closure disk 19 as by means of the welds shown. The upstream end of tube 11 is supported by bearing plates 36 attached to spokes 17 as by means of the welds shown. Inner tube 12 is fixed with respect to housing 16 by means of key 37', attached to housing 16 as by means of the welds shown, and extending through slot 39 in outer tube 11. By this arrangement outer tube 11 will expand or contract with changes in temperature longitudinally upstream from closure disk 19 and inner tube 12 will expand or contract longitudinally downstream from key 37'. Thus, as explained in connection with the embodiment given in Figure 1, the amount of air admitted into the various combustion zones can be controlled by proper mounting of the tubes 11 and 12 with respect to the alignment, number and size of the perforations in each, so as to vary the size of the openings admitting air into the said various combustion zones in accordance with changes in temperature therein.

The embodiments shown in Figures 2 to 4-A have been described briefly for the sake of brevity. However, the operation of these embodiments will be readily apparent to those skilled in the art from the above disclosure of the operation of the embodiment shown in Figure 1. Various modifications and arrangements of tubes, perforations, etc., are possible within the scope of the embodiments shown in Figures 2 to 4-A as discussed in connection with the embodiment shown in Figure 1.

Reasonable variation and modification are possible within the scope of the foregoing disclosure, drawings, and the appended claim to the invention, the essence of which is that a method and apparatus have been provided for automatically controlling the air-fuel ratio within the combustion zone of a combustion chamber by varying, in accordance with changes in temperature, the sizes of the openings or ports admitting air to the said zone.

I claim:

A jet engine combustion chamber comprising, in combination: a housing; a flame tube having at least a primary and a secondary combustion section and mounted within said housing so as to form an annular space for the flow of air between said flame tube and said housing; an annular closure member positioned between said housing and said flame tube near the downstream end of said annular space; said flame tube being comprised of three concentrically mounted perforated tubes expansible and contractible with changes in temperature, one of said three perforated tubes being fixed to said housing at a point intermediate its ends and concentrically mounted in telescopic sliding relationship to the adjacent end portions of the other two tubes, a second of said three perforated tubes being closed at its upstream end to form an enclosed space and fixed near said upstream end to said housing, the third of said three perforated tubes being fixed near its downstream end to said housing adjacent said annular closure member; said perforated tubes being concentrically mounted and slideably engaged with respect to each other so as to align and to vary the alignment of the perforations provided therein for admitting air only from said annular space into said flame tube; a portion of said perforations forming openings into said primary combustion section; another portion of said perforations forming openings into said secondary combustion section; the location of the perforations in each of said tubes being predetermined relative to the location of the perforations in the other of said tubes so as to permit control of the amount of air admitted to both of said primary and said secondary combustion sections, simultaneously; the alignment of each said portion of perforations being variable and depending upon (1) said predetermined relative locations of said perforations, (2) differences in thermal expansion of said tubes, and (3) temperature changes within said flame tube; ignition means positoned in said upstream end and extending into said enclosed space; and fuel injection means positioned in said upstream end and extending into said enclosed space.

References Cited in the file of this patent

UNITED STATES PATENTS

| | | |
|---|---|---|
| 1,733,792 | Good | Oct. 29, 1929 |
| 2,457,157 | King | Dec. 28, 1948 |
| 2,469,679 | Wyman | May 10, 1949 |
| 2,601,000 | Nerad | June 17, 1952 |
| 2,621,477 | Powter et al. | Dec. 16, 1952 |

UNITED STATES PATENT OFFICE
Certificate of Correction

Patent No. 2,837,893

June 10, 1958

Robert M. Schirmer

It is hereby certified that error appears in the printed specification of the above numbered patent requiring correction and that the said Letters Patent should read as corrected below.

Column 2, line 10, for "expanasion" read —expansion—; line 31, for "leat" read —least—; column 3, line 72, for "perforations" read —instances—; column 6, line 37, for "positoned" read —positioned—.

Signed and sealed this 28th day of April 1959.

[SEAL]

Attest:
T. B. MORROW,
*Attesting Officer.*

ROBERT C. WATSON,
*Commissioner of Patents.*